(12) United States Patent
Chanduri et al.

(10) Patent No.: US 10,990,968 B2
(45) Date of Patent: Apr. 27, 2021

(54) ACOUSTIC BASED PRE-STAGED TRANSACTION PROCESSING

(71) Applicant: NCR Corporation, Atlanta, GA (US)

(72) Inventors: Anand Chanduri, Hyderabad (IN); Naresh Tummanapalli, Hyderabad (IN)

(73) Assignee: NCR Corporation, Atlanta, GA (US)

( * ) Notice: Subject to any disclaimer, the term of this patent is extended or adjusted under 35 U.S.C. 154(b) by 13 days.

(21) Appl. No.: 16/295,569

(22) Filed: Mar. 7, 2019

(65) Prior Publication Data

US 2020/0286086 A1 Sep. 10, 2020

(51) Int. Cl.
*G06Q 20/38* (2012.01)
*H04L 9/06* (2006.01)
*G06F 21/31* (2013.01)

(52) U.S. Cl.
CPC ......... *G06Q 20/3827* (2013.01); *G06F 21/31* (2013.01); *H04L 9/0643* (2013.01); *G06Q 2220/00* (2013.01)

(58) Field of Classification Search
CPC ............ G06Q 20/3827; G06Q 2222/00; H04L 9/0643
See application file for complete search history.

(56) References Cited

U.S. PATENT DOCUMENTS

| | | | | |
|---|---|---|---|---|
| 9,082,413 B2* | 7/2015 | Herring | ............ | G10L 25/51 |
| 9,264,817 B2* | 2/2016 | Shim | ............ | H04N 21/43615 |
| 9,900,355 B2* | 2/2018 | Zheng | ............ | H04L 65/403 |
| 9,940,948 B2* | 4/2018 | Markov | ............ | G06F 3/165 |
| 10,044,448 B2* | 8/2018 | Mufti | ............ | H04B 13/00 |
| 10,181,910 B2* | 1/2019 | Mallik | ............ | H04B 11/00 |
| 10,194,239 B2* | 1/2019 | Yliaho | ............ | H04R 3/00 |
| 2012/0051187 A1* | 3/2012 | Paulson | ............ | H04B 11/00 367/135 |
| 2012/0084131 A1* | 4/2012 | Bergel | ............ | G06Q 30/0225 705/14.26 |
| 2013/0171930 A1* | 7/2013 | Anand | ............ | G06Q 30/0226 455/41.1 |
| 2013/0301392 A1* | 11/2013 | Zhao | ............ | G06Q 20/3272 367/135 |
| 2015/0310868 A1* | 10/2015 | Mallik | ............ | H04B 11/00 367/135 |

* cited by examiner

*Primary Examiner* — Robert R Niquette
*Assistant Examiner* — Pierre L Maccagno
(74) *Attorney, Agent, or Firm* — Schwegman, Lundberg & Woessner

(57) ABSTRACT

A method includes receiving selection of an audible audio clip by a user, receiving transaction details including an indication of an amount and an identification of an account number associated with the user and corresponding to a pre-staged transaction, encoding the transaction details into an inaudible audio clip, and combining the audible audio clip and the inaudible audio clip into a transferrable audio file that when played, identifies the pre-staged transaction for execution. The pre-staged transaction may be initiated by receiving an audio rendering of the audio file, determining a duration and a size of the audible portion, decoding the inaudible portion to determine transaction details, including an amount and account identification, and the duration and size of the audible portion, validating the transaction based on the decoded and determined duration and size of the audible portion matching, and executing the transaction responsive to validation and the decoded transaction details.

15 Claims, 3 Drawing Sheets

ACOUSTIC BASED PRE-STAGED TRANSACTION PROCESSING

BACKGROUND

Transactions, such as withdrawals from a bank, may be pre-staged by identifying various parameters, such as an account and a dollar amount for the withdrawal. Execution of the transaction may then be accomplished via use of a one-time password, bar code, or QR code that is recognized by the bank, such as by an automated teller machine (ATM), bank, or retail center. One-time passwords can be forgotten, and codes can be copied and nefariously used by a third party to execute a transaction before the intended party can use the code. Other solutions, such as the use of location beacons to detect the presence of the user along with an ID retrieved from a device of the user can be complex and expensive to implement.

SUMMARY

A method includes receiving selection of an audible audio clip by a user, receiving transaction details including an indication of an amount and an identification of an account number associated with the user and corresponding to a pre-staged transaction, encoding the transaction details into an inaudible audio clip, and combining the audible audio clip and the inaudible audio clip into a transferrable audio file that when played, identifies the pre-staged transaction for execution.

The pre-staged transaction may be initiated by receiving an audio rendering of the audio file, determining a duration and a size of the audible portion, decoding the inaudible portion to determine transaction details, including an amount and account identification, and the duration and size of the audible portion, validating the transaction based on the decoded and determined duration and size of the audible portion matching, and executing the transaction responsive to validation and the decoded transaction details.

DETAILED DESCRIPTION

Figure 1:
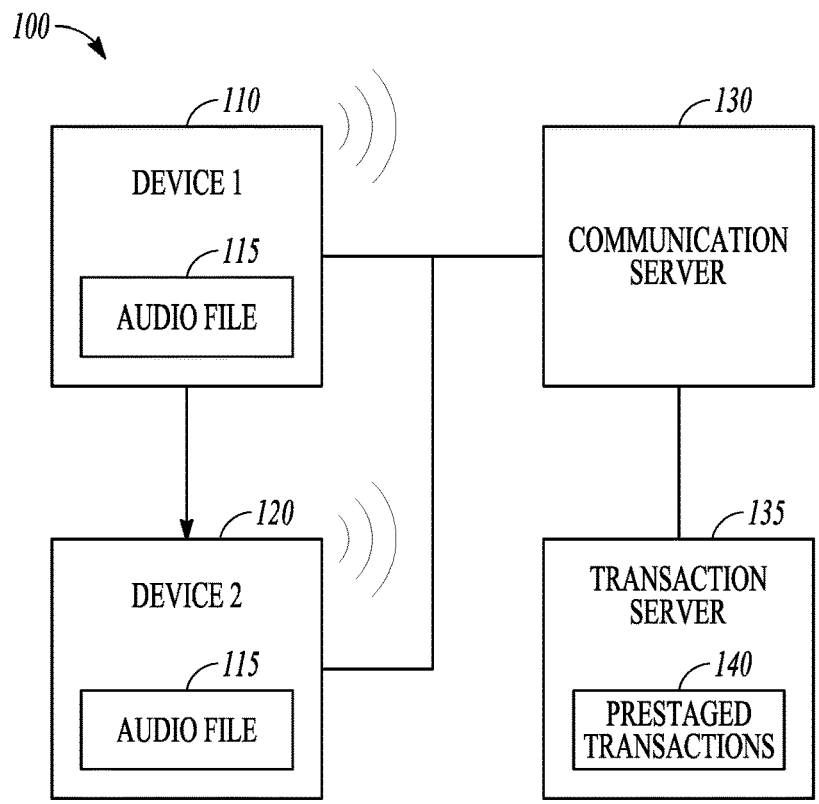
FIG. 1 is a block diagram illustration of an audible pre-staged transaction processing system according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

A pre-staged transaction is encoded into a one-time use audio clip, referred to as an audio file, that can be transferred. A first user, such as an account owner may utilize an app on a mobile device or access a website to select an audible audio clip as well as transaction details. The transaction details are encoded into an inaudible audio clip at a selected frequency. Typical frequencies for the inaudible audio clip may be 20 KHz or higher, above the range that humans can hear, yet within the range that microphones can reliable detect. One frequency, or multiple frequencies may be used. The encoding may be performed by any suitable encoder, such as Google Speech-to-text encoding (cloud-.google.com/speech-to-text//docs/base64-encoding.) The audible audio clip may be in digitized form, and may be combined with the encoded inaudible clip to generate the audio file. The inaudible audio clip may also be encrypted for additional security.

The audio file may then be transferred to a second user such as a family member or friend, or even to a merchant as payment for goods and services. The second user may proceed to a transaction site, such as a retail location with a machine capable of receiving the audio file and processing the transaction or automated teller machine, many of which include suitable microphones. The second user may select an audio file transaction option on the machine and play the audio file. The transaction site machine has a microphone capable of receiving the sound created by playing or rendering the audio file. The received sound is then digitized.

A size and duration of the audible portion may be included in the transaction details and used to validate that the transaction should be executed. The transaction is then executed. The transaction may be a withdrawal of cash, which is provided to the second user. The audio file may then be rendered invalid such that duplicate transactions are prevented. Rendering the audio file invalid may include erasing it from records accessed by the transaction site or otherwise recording that the transaction has been completed.

FIG. 1 is a block diagram illustration of an audible pre-staged transaction processing architecture 100 according to an example embodiment. Architecture 100 includes a first user device 110, device 1, that may be a mobile device or other type of computing device that is capable of handling an audio file 115. The audio file 115 includes an audible portion and an inaudible portion, that when rendered or played at a machine, such as an ATM, may be used to cause execution of a pre-staged transaction, such as a cash withdrawal.

The first user device 110 may be used to transfer the audio file 115 to a second user device 120, device 2, which may play the file and receive the results of the transaction, such as cash.

The devices may communicate via a communications server 130. The communications server may be an email server, web server, a cellular station, or any other type of processing device capable of facilitating communications. The audio file may be transferred via email, text, file transfer, or any other method capable of transferring the audio file or otherwise facilitating transfer of the audio file to enable rendering of the audio file via device 2 120.

The communication server 130 may be communicatively coupled to a transaction server 135, such a financial institute that manages financial accounts that are identifiable via a routing number and an account number. In some embodiments, the communications sever 130 and transaction server 135 may be the same server. The transaction server 135 includes a list of pre-staged transactions 140 to enable execution of the transaction identified by the rendered audio file 115. The pre-staged transactions may also have an expiration time, which may be made known to a user. If the expiration time passes, the transaction may be removed from the list, or otherwise indicates the pre-staged as no longer valid, preventing the pre-staged transaction from being executed.

In one embodiment, software on the user device, such as an app on a mobile device may create the audio file based on user input and stored account details. The app may also encrypt the inaudible clip using a hash function, and send a copy of the transaction details to the transaction server 135 for inclusion in the list 140. In further embodiments, the pre-staged transaction may be created via a website used by a financial institution to allow customers to manage financial accounts. The created audio file may be emailed to the customer from the server or otherwise made available to the user for transfer to another user. In still further embodiments, the functions of creating the audio file may be distributed between the mobile device app and a website.

The audio file can also be created and hosted either on the bank server present in a remote location. The audio file once created can also be hosted on a personnel online location from where customer transfer to a relative or friend.

The creation of the audio file may also include authenticating the user and the ability to create the transaction with the transaction server 135, either via the app by providing credentials to the server 135 or providing credentials via a web interface.

The audio file transferred to the device 2 120 may be transferred entirely, or may be transferred via a link and played by selecting the link while executing the transaction.

Figure 2:
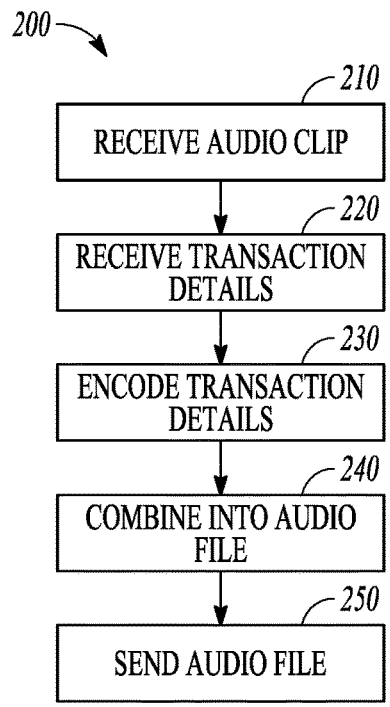
FIG. 2 is a flowchart illustrating a method of creating an audible pre-staged transaction file according to an example embodiment.

FIG. 2 is a flowchart illustrating a computer implemented method 200 of creating an audible pre-staged transaction file according to an example embodiment. Method 200 may be implemented via an app on a mobile device, via a website rendered on a mobile or stationary device such as a laptop, or a combination of devices. Method 200 begins by receiving a selection from a user indicative of a desire to create a pre-staged transaction. At operation 210, a user may select an audible clip for use in creating the audio file corresponding to the pre-staged transaction. The audible clip may be selected from a list or menu of audible clips, created by the user recording an audible clip such as an utterance, uploading an audible clip, or other means for selecting an audible clip, such as downloading a portion of an advertisement, television show, song, or movie dialog, or even just a tone or white noise.

At operation 220, transaction details are received from user selections or indications of an amount and an identification of an account number associated with the authorized user and corresponding to the pre-staged transaction. The details may be entered by the user via the app or website or other means of receiving transaction details. The transaction details are optionally encrypted and then encoded at operation 230 into an inaudible audio clip having a frequency or frequencies that, when played, are above approximately 20 KHz. Encryption may include use of a hash to encrypt and an associated hash key to decrypt. The hash key may be stored in the list 140. At operation 240 the audible audio clip and the inaudible audio clip are combined into a transferrable audio file. The audio file may be transferred or otherwise sent to another user device at operation 250. When rendered at a device that can receive and digitize the sound, the pre-staged transaction is executed.

In one embodiment, the transaction details are also provided to the transaction server 135 for storage in list 140. Execution of the transaction is contingent on the pre-staged transaction being stored in the list 140. In response to execution, the corresponding transaction in the list 140 may be rendered inoperative, such as by deleting, or otherwise indicating that the transaction has been processed. The transaction details may also include a transaction number such that the decoded transaction may be correlated with the corresponding transaction in the list 140.

Figure 3:
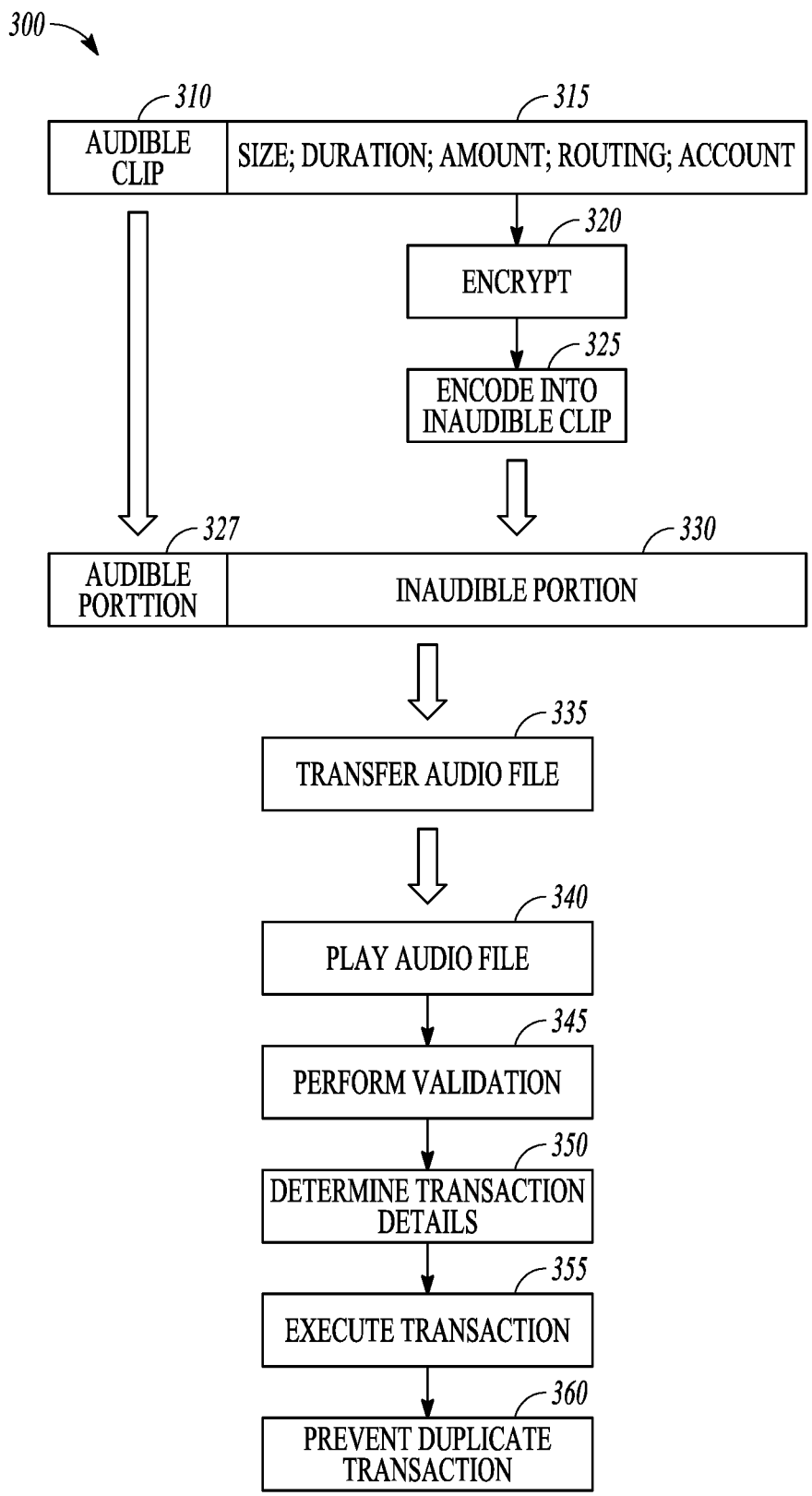
FIG. 3 is a diagram illustrating creation and use of an audio file for a pre-staged transaction according to an example embodiment.

FIG. 3 is a diagram illustrating creation and use of an audio file for a pre-staged transaction generally at 300 according to an example embodiment. The audible clip is indicated at 310 and has a duration of about 2 seconds or more. The duration of the entire audio file may be up to 15 seconds in one embodiment. In a further embodiment, the duration of the audio file may be between 5 and 15 seconds. In still further embodiments, the duration may be longer or shorter, but the audible portion should be long enough to measure the length in units of time, such as seconds, yet not too long to be annoying while executing the associated transaction. The duration is also related to the length of the data representing the audible clip 310. Too long a duration results in a larger file that consumes both processing resources and communication resources. The inaudible portion may be considerably shorter than the in audible portion.

The inaudible portion may contain error correction codes and other encodings to ensure the ability to correctly transfer the information to the machine via sound.

Transaction details 315 includes a size and duration of the audible clip, an amount, a routing number, and an account number in one embodiment. A transaction number or some other identifier, such as a globally unique identifier (GUID) may be used to give the pre-staged transaction a unique identification for correlation with the list of pre-staged transactions in the list 140. The transaction details 315 may be encrypted as indicated at 320 and then encoded into an inaudible clip 325.

Next, the audible clip, now referred to as audible portion 327 is combined with the inaudible clip as indicated at 330. The clips may be concatenated or other wise combined in a manner than can be played and received to be separately identified. Such identification may be based on detecting a frequency change, as the audible file is limited to frequencies below approximate 20 KHz, while the inaudible file is above approximately 20 KHz. In other embodiments, a transition sound or a gap in sound that may be inserted between the portions that is easily recognized by the transaction processing machine. The gap may be of predetermined length or range of durations, such as two seconds or more. The audible clip may be rejected if it contains a gap of similar duration, or such gaps in the audible clip may be modified to be sufficiently less than the gap duration to form the audible portion 327.

In further embodiments the portions may be interleaved as opposed to simply concatenated, or even overlapped such that they are played at the same time, with frequencies separated by the machine using analog or digital filters, such as band pass filters.

The audio file may be transferred at 335 to another user, who may engage a transaction execution machine, such as an ATM or a machine at a retail location having microphone with the capability to receive audible sounds and inaudible sounds in the frequency range at which the audio file is encoded. Such encoded audio file may be limited in frequency to not exceed the capabilities of microphones or audio ports of such machines. The user that received the audio file may select a mode of the machine to accept an audio file corresponding to a pre-staged transaction prior to playing the audio file, and play the audio file when prompted to do so. The user should hold their device within range of the microphone of the machine, or otherwise transfer the sound to the machine.

Upon playing the audio file and receiving it, the machine will perform validation at 345 by determining a duration and a size of the audible clip or portion of the audio file and comparing it to the duration and size encoded in the inaudible clip or portion. If the measured duration and size match the encoded size and portion, the transaction is validated. Once validated, the inaudible portion is decoded to determine transaction details at 350, including an amount and account identification. Note that the decoding of the validation details may occur prior to validation, and that the entire inaudible portion may be decoded prior to validation, but not used if the audio file is not validated.

Decoding the inaudible portion includes digitizing the received inaudible portion and decrypting the digitized inaudible portion using a hash key if the inaudible portion is encrypted. The hash key may be obtained from the list 140 to decrypt the inaudible portion when encrypted with the corresponding hash. Public key private key encryption or other forms of secure encryption may be used in further embodiments.

The transaction is executed at 355 responsive to validation and the decoded transaction details. Execution may also be contingent on the transaction being found in the list 140, which also allows prevention of duplicate transactions at 360. Execution may also be predicated on the user providing an additional password for the transaction, which may be provided separately from the communication providing the audio file, or previously associated with the user. The account identification comprises a routing number and an account number, and wherein the amount comprises an amount for a cash withdrawal to enable execution of the transaction. Execution may be followed by erasing the transaction from the list 140, or otherwise indicating that the transaction has already been executed to ensure the transaction is executed only once.

Figure 4:
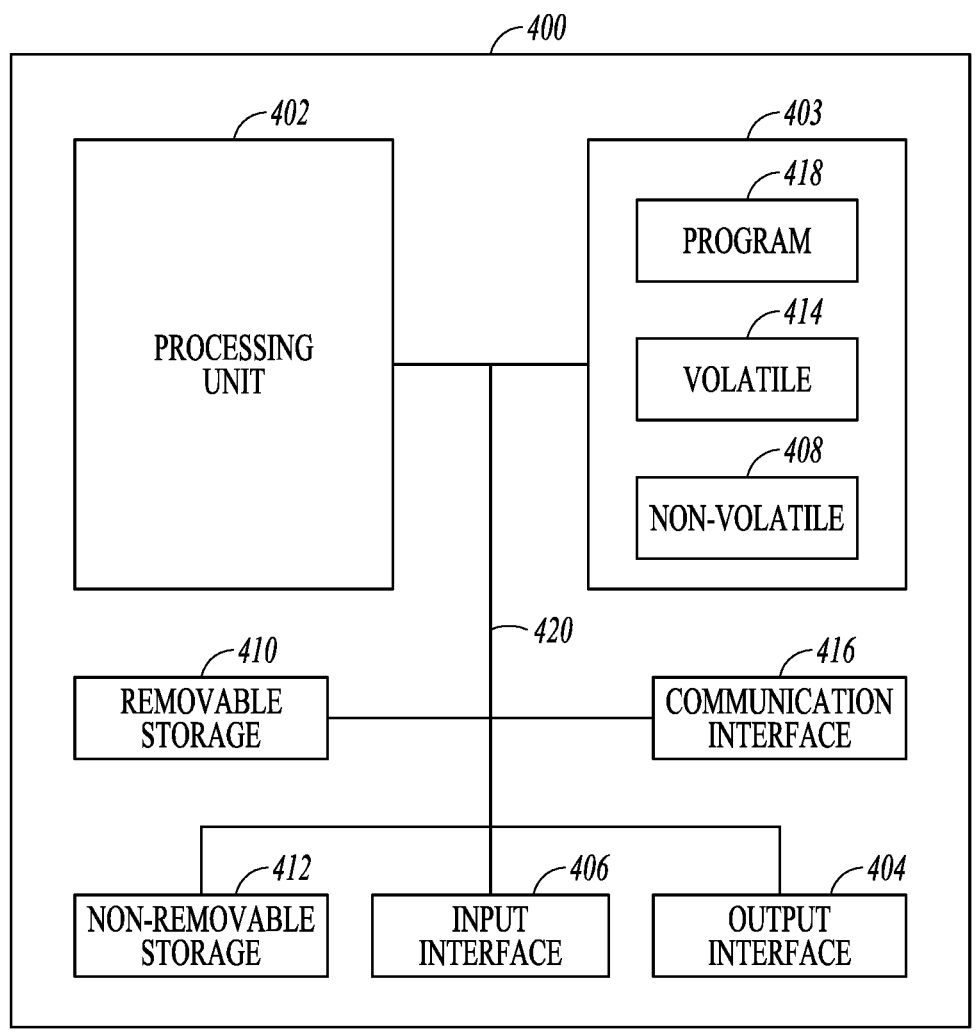
FIG. 4 is a block schematic diagram of a computer system to implement one or more example embodiments.

FIG. 4 is a block schematic diagram of a computer system 400 to implement and manage the use of one-time use audio files for pre-staged transactions. System 400 may be used as the machine for receiving audio files and providing the proceeds from transactions, as one or more of the servers, and as the devices used by users, as well as for performing methods and algorithms according to example embodiments. All components need not be used in various embodiments.

One example computing device in the form of a computer 400 may include a processing unit 402, memory 403, removable storage 410, and non-removable storage 412. Although the example computing device is illustrated and described as computer 400, the computing device may be in different forms in different embodiments. For example, the computing device may instead be a smartphone, a tablet, smartwatch, smart storage device (SSD), or other computing device including the same or similar elements as illustrated and described with regard to FIG. 4. Devices, such as smartphones, tablets, and smartwatches, are generally collectively referred to as mobile devices or user equipment.

Although the various data storage elements are illustrated as part of the computer 400, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 403 may include volatile memory 414 and non-volatile memory 408. Computer 400 may include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 may include or have access to a computing environment that includes input interface 406, output interface 404, and a communication interface 416. Output interface 404 may include a display device, such as a touchscreen, that also may serve as an input device. The input interface 406 may include one or more of a touchscreen, touchpad, mouse, keyboard, camera, one or more device-specific buttons, one or more sensors integrated within or coupled via wired or wireless data connections to the computer 400, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 400 are connected with a system bus 420.

Computer-readable instructions stored on a computer-readable medium are executable by the processing unit 402 of the computer 400, such as a program 418. The program 418 in some embodiments comprises software to implement one or more of the methods used to create, transfer, receive audio, and process pre-staged transaction via the audio file. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 418 along with the workspace manager 422 may be used to cause processing unit 402 to perform one or more methods or algorithms described herein.

EXAMPLES

1. A computer implemented method includes receiving selection of an audible audio clip by an authorized user, receiving transaction details including an indication of an amount and an identification of an account number associated with the authorized user and corresponding to a pre-staged transaction, encoding the transaction details into an inaudible audio clip, and combining the audible audio clip and the inaudible audio clip into a transferrable audio file that when played, identifies the pre-staged transaction for execution.

2. The method of example 1 wherein the audible audio clip comprises a utterance by the authorized user.

3. The method of any of examples 1-2 the audible audio clip is selected from a menu of audible audio clips.

4. The method of any of examples 1-3 wherein the inaudible audio clip has a frequency, when played, above approximately 20 KHz.

5. The method of any of examples 1-4 wherein encoding the inaudible audio clip includes encrypting the transaction details.

6. The method of example 5 wherein encrypting the transaction details comprises using a hash value to encrypt the transaction details and providing a hash key to descript the encrypted transaction details.

7. The method of any of examples 1-6 wherein encoding the inaudible audio clip comprises including a digital size and duration of the audible audio clip.

8. The method of any of examples 1-7 wherein the indication of an amount and an identification of an account number comprise a transaction number.

9. The method of any of examples 1-8 and further comprising transferring the audio file to a device of an intended recipient user.

10. A method of initiating a pre-staged transaction includes receiving an audio rendering of an audio file that includes an audible portion and an inaudible portion, determining a duration and a size of the audible portion, decoding the inaudible portion to determine transaction details, including an amount and account identification, and the duration and size of the audible portion, validating the transaction based on the decoded and determined duration and size of the audible portion matching, and executing the transaction responsive to validation and the decoded transaction details.

11. The method of example 10 wherein decoding transaction details to obtain the amount and account identification are performed after validation.

12. The method of any of examples 10-11 wherein the inaudible portion is encrypted, and wherein decoding the inaudible portion includes digitizing the received inaudible portion, and decrypting the digitized inaudible portion using a hash key.

13. The method of any of examples 10-12 wherein receiving an audio rendering includes detecting a frequency change between the audible and inaudible portions, and providing the inaudible portion for decoding in response to such frequency change detection.

14. The method of any of examples 10-13 wherein the account identification comprises a routing number and an account number, and wherein the amount comprises an amount for a cash withdrawal.

15. A machine-readable storage device having instructions for execution by a processor of a machine to cause the processor to perform operations to perform a method of generating a pre-staged transaction. The operations includes receiving selection of an audible audio clip by an authorized user, receiving transaction details including an indication of an amount and an identification of an account number associated with the authorized user and corresponding to a pre-staged transaction, encoding the transaction details into an inaudible audio clip, and combining the audible audio clip and the inaudible audio clip into a transferrable audio file that when played, identifies the pre-staged transaction for execution.

16. The device of example 15 wherein the audible audio clip comprises a utterance by the authorized user or is selected from a menu of audible audio clips.

17. The device of any of examples 15-16 wherein the inaudible audio clip has a frequency, when played, above approximately 20 KHz.

18. The device of any of examples 15-17 wherein encoding the inaudible audio clip includes encrypting the transaction details by using a hash value to encrypt the transaction details such that the encrypted the encrypted transaction details are decryptable by use of a hash key.

19. The device of any of examples 15-18 wherein encoding the inaudible audio clip comprises including a digital size and duration of the audible audio clip.

20. The device of any of examples 15-19 and further comprising transferring the audio file to a device of an intended recipient user.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
   receiving selection of an audible audio clip by an authorized user;
   receiving transaction details including an indication of an amount and an identification of an account number associated with the authorized user and corresponding to a pre-staged transaction;
   encoding the transaction details into an inaudible audio clip; and
   combining the audible audio clip and the inaudible audio clip into a transferrable audio file that when played, identifies the pre-staged transaction for execution.

2. The method of claim 1 wherein the audible audio clip comprises a utterance by the authorized user.

3. The method of claim I the audible audio clip is selected from a menu of audibleaudio clips.

4. The method of claim 1 wherein the inaudible audio clip has a frequency, when played, above approximately 20 KHz.

5. The method of claim 1 wherein encoding the inaudible audio clip includes encrypting the transaction details.

6. The method of claim 5 wherein encrypting the transaction details comprises using a hash value to encrypt the transaction details and providing a hash key to descript the encrypted transaction details.

7. The method of claim 1 wherein encoding the inaudible audio clip comprises including a digital size and duration of the audible audio clip.

8. The method of claim 1 wherein the indication of an amount and an identification of an account number comprise a transaction number.

9. The method of claim 1 and further comprising transferring the audio file to a device of an intended recipient user.

10. A machine-readable storage device having instructions for execution by a processor of a machine to cause the processor to perform operations to perform a method of generating a pre-staged transaction, the operations comprising:
    receiving selection of an audible audio clip by an authorized user;
    receiving transaction details including an indication of an amount and an identification of an account number associated with the authorized user and corresponding to a pre-staged transaction;
    encoding the transaction details into an inaudible audio dip; and
    combining the audible audio clip and the inaudible audio clip into a transferrable audio file that when played, identifies the pre-staged transaction for execution.

11. The device of claim 10 wherein the audible audio clip comprises a utterance by the authorized user or is selected from a menu of audible audio clips.

12. The device of claim 10 wherein the inaudible audio clip has a frequency, when played, above approximately 20 KHz.

13. The device of claim 10 wherein encoding the inaudible audio clip includes encrypting the transaction details by using a hash value to encrypt the transaction details such that the encrypted the encrypted transaction details are decryptable by use of a hash key.

14. The device of claim 10 wherein encoding the inaudible audio clip comprises including a digital size and duration of the audible audio clip.

15. The device of claim 10 and further comprising transferring the audio file to a device of an intended recipient user.

* * * * *